United States Patent [19]
Chen

[11] Patent Number: 5,839,919
[45] Date of Patent: Nov. 24, 1998

[54] IN-CAR USED MOBILE PHONE FIXING SEAT ASSEMBLY TO WHICH OTHER ELECTRICAL APPLIANCES ARE ADDIBLE

[75] Inventor: Tonny Chen, Changhua, Taiwan

[73] Assignee: E. Lead Electronic Co., Ltd., Changhua, Taiwan

[21] Appl. No.: 795,664

[22] Filed: Feb. 6, 1997

[51] Int. Cl.⁶ .................................................. H01R 13/627
[52] U.S. Cl. .......................... 439/529; 379/446; 455/90
[58] Field of Search ................................ 439/527, 162, 439/163, 529, 531, 534; 455/90; 379/446, 455, 454

[56] References Cited

U.S. PATENT DOCUMENTS 2,149,549  3/1939  Reis ........................................ 439/534
2,691,721  10/1954  Bornhuetter ............................ 439/534
5,179,590  1/1993  Wang ...................................... 379/446
5,414,770  5/1995  Wang ...................................... 379/446
5,659,887  8/1997  Ooe ........................................... 455/90
5,708,706  1/1998  Hughes et al. .......................... 379/455

Primary Examiner—Neil Abrams
Assistant Examiner—Tho D. Ta
Attorney, Agent, or Firm—Bacon & Thomas

[57] ABSTRACT

An in-car used mobile phone fixing seat assembly to which other electrical appliances are addible, including an electrically conductive flexible supporting member and a mobile phone fixing seat. One end of the supporting member is connected with a cigarette lighter plug for inserting into a lighter socket of the car. The other end of the supporting member is disposed with a connecting section for engaging with the fixing seat. The fixing seat has a receptacle for receiving and powering on a mobile phone and peripheral electrical equipments. The position and angle of the fixing seat can be freely adjusted according to a user's requirements.

7 Claims, 12 Drawing Sheets

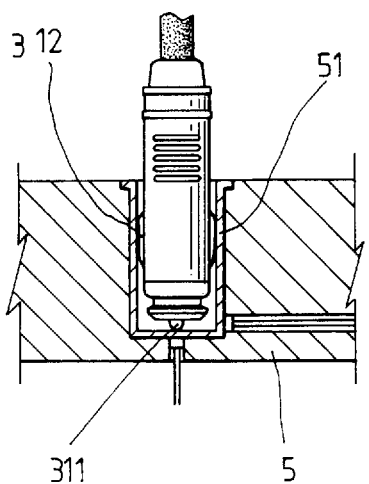
FIG. 3
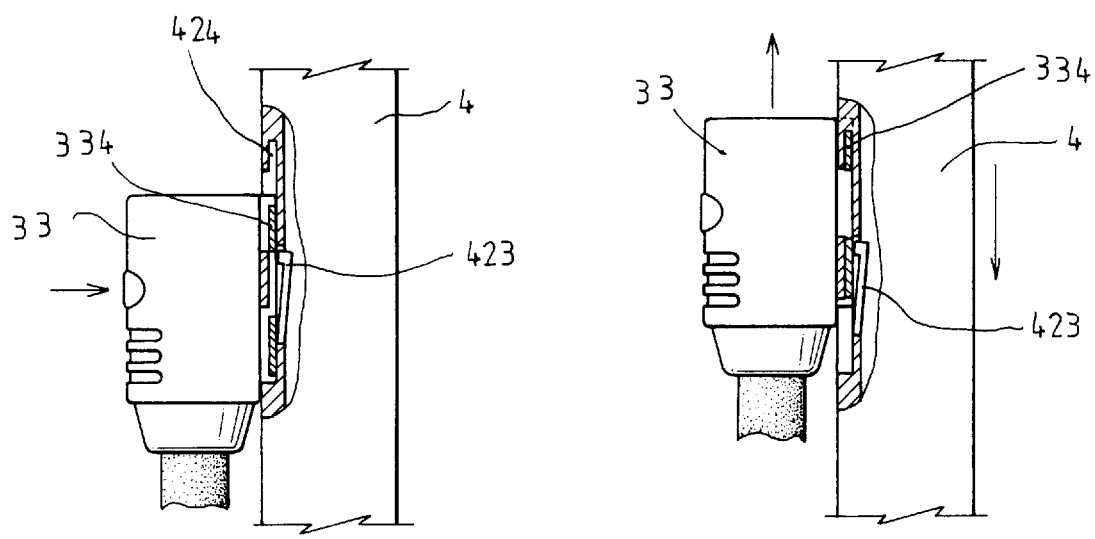
FIG. 4
FIG. 5

5,839,919

IN-CAR USED MOBILE PHONE FIXING SEAT ASSEMBLY TO WHICH OTHER ELECTRICAL APPLIANCES ARE ADDIBLE

BACKGROUND OF THE INVENTION

The present invention relates to an in-car used mobile phone fixing seat assembly to which other electrical appliances are addible. The fixing seat assembly is inserted in the lighter socket of the car and has a receptacle for receiving and powering on the mobile phone. In addition, many other electrical appliances such as charging device, recorder and holdfree device can be added to the fixing seat assembly to enhance the function of the in-car used mobile phone.

Many kinds of peripheral equipments of in-car used mobile phone, such as charger and mobile phone fixing seat, have been developed. Some shortcomings exist in such products in use as follows:

1. As shown in FIG. 1, the mobile phone T is placed in the mobile phone fixing seat 1. Such mobile phone fixing seat 1 is generally secured on the car body 2 by a nail or a pin A. This will damage the structure of the car body.

2. When placed in the fixing seat, the mobile phone is often powered on by the lighter socket of the car so as to save the energy of the battery. However, the car has limited number of lighter socket (generally one car has only one lighter socket) so that in case that it is necessary to at the same time use other electrical peripheral appliances such as holdfree device, charger, recorder, etc., no additional lighter socket will be available. Moreover, the various peripheral equipments will have complicated wire layouts which often occupy much room. This causes great inconvenience to the user.

SUMMARY OF THE INVENTION

It is therefore a primary object of the present invention to provide an in-car used mobile Phone fixing seat assembly to which other electrical appliances are addible. The fixing seat assembly includes an electrically conductive flexible supporting member and a mobile Phone fixing seat. One end of the supporting member is connected with a cigarette lighter plug for inserting into a lighter socket of the car. The other end of the supporting member is disposed with a connecting section for engaging with the fixing seat. The fixing seat has a receptacle for receiving and powering on a mobile Phone and other peripheral electrical equipments such as holdfree device, recorder, charger, etc.

It is a further object of the present invention to provide the above fixing seat assembly in which the flexible supporting member permits the fixing seat as well as the mobile phone to be freely adjusted in position so as to meet the requirement of the user.

The present invention can be best understood through the following description and accompanying drawings, wherein:

BRIEF DESCRIPTION OF THE DRAWINGS

FIG. 2A is an enlarged diagram of the insertion seat thereof.

FIG. 3 is a sectional view showing that the lighter plug is inserted into the lighter socket;

FIG. 4 shows that the supporting member is engaged with the fixing seat by insertion in one state;

FIG. 5 shows that the supporting member is engaged with the fixing seat by insertion in another state;

DETAILED DESCRIPTION OF THE PREFERRED EMBODIMENTS

Figure 1A:
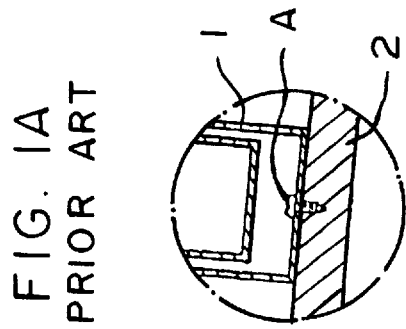
FIG. 1 shows the application of a conventional mobile phone fixing seat.
Figure 1:
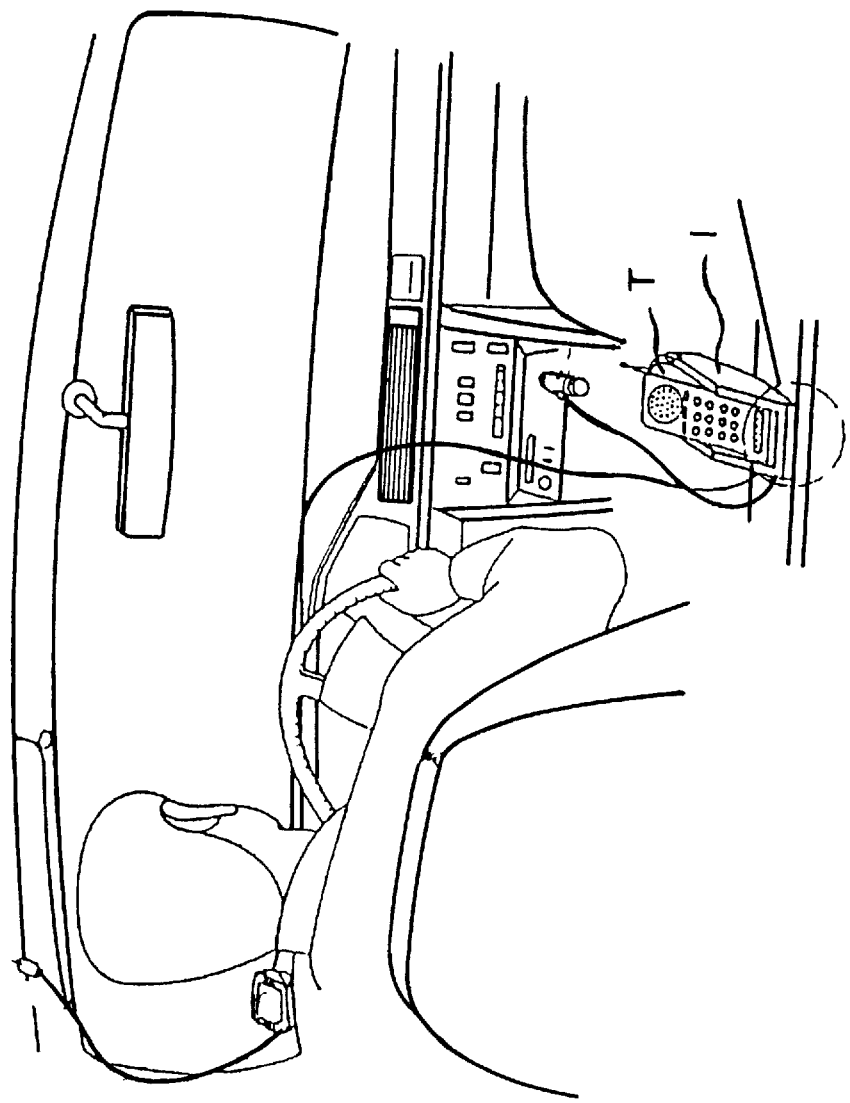
Figure 2:
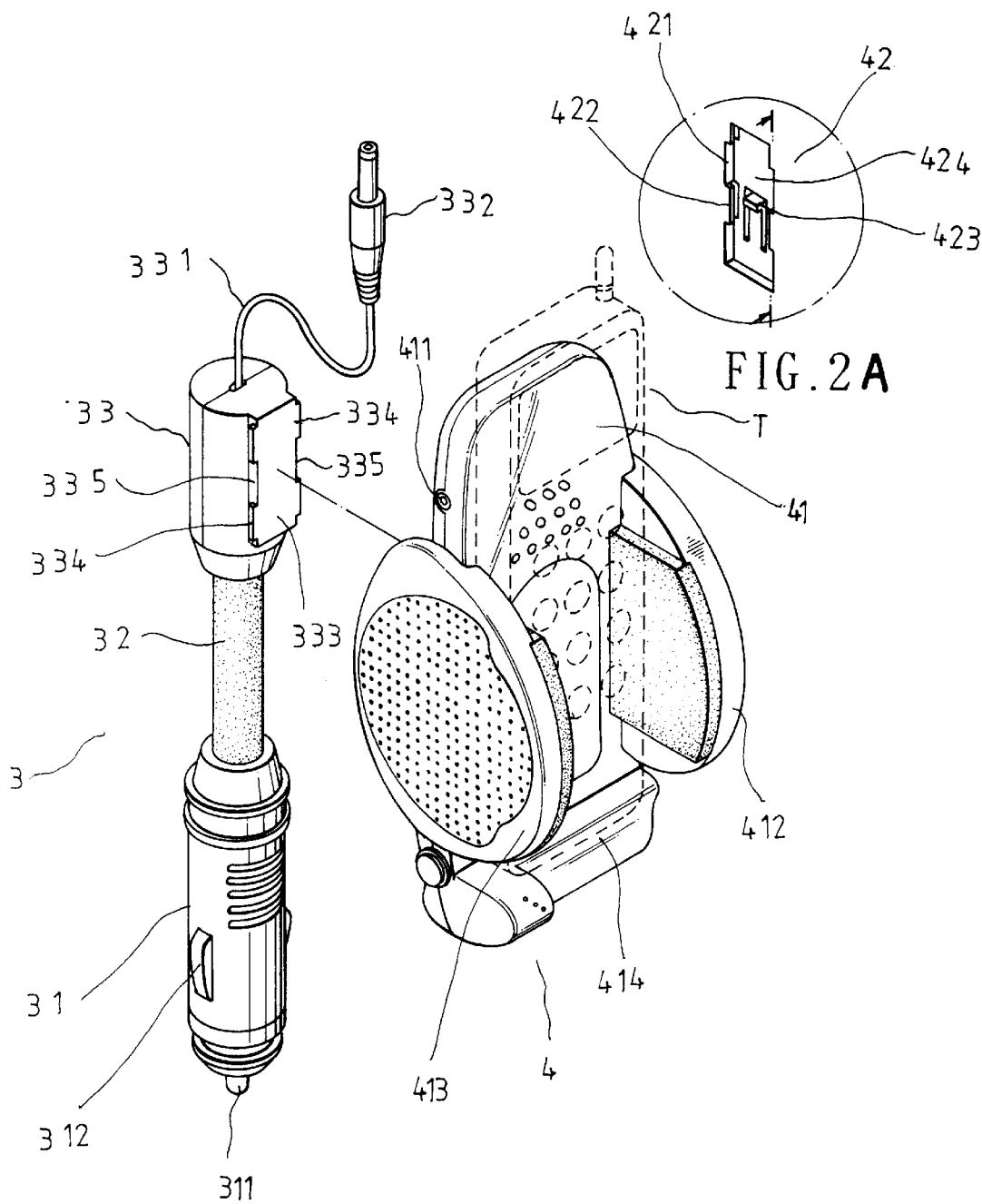
FIG. 2 is a perspective exploded view of a first embodiment of the present invention.

Please refer to FIG. 2. The present invention mainly includes an electrically conductive flexible supporting member 3 and a mobile phone fixing seat 4.

One end of the supporting member 3 is connected with a cigarette lighter plug 31 for inserting into the lighter socket of the car. The other end of the supporting member is disposed with a connecting section 33. A wire 331 connected with a power terminal 332 extends from the connecting section 33. The power terminal 332 can be inserted into an insertion socket 411 of the fixing seat 4 for transmitting the power supplied by the lighter. An engaging face 333 is disposed on one side of the connecting section 33. Several wedge plates 334 and wedge slots 335 are disposed respectively on two lateral edges of the engaging face 333. A middle section 32 of the supporting member 3 is formed as a freely bendable cable.

The front face 41 of the fixing seat 4 is disposed with two lateral arms 412, 413 on two sides and a stopper base 414 at bottom end to define a receptacle at the center for receiving a mobile phone T. The back face of the fixing seat 4 is disposed with an insertion seat 42. Several wedge plates 421 and wedge slots 422 are disposed on two lateral edges of the insertion seat 42. In addition, the insertion seat 42 is disposed with a resilient plate 423 and an insertion cavity 424. An additional power output socket (not shown) can be disposed on a lower side or a lateral side of the fixing seat 4 for connecting with other electrical appliances.

When using the present invention, the lighter plug 31 of the supporting member 3 is inserted into the lighter socket 51 of the car 5, whereby the positive and negative ends 311, 312 of the lighter plug electrically contact with the positive and negative terminals of the lighter socket 51 as shown in FIG. 3. The wedge plates 334 of the connecting section 33 of the supporting rod are fitted into the wedge slots 422 of the insertion seat 42 of the fixing seat 4 as shown in FIGS.

4 and 5. At this time, the resilient plate 423 is biased. Then the wedge plates 334 of the connecting section 33 are upward pushed into the insertion cavity 424 to engage the connecting section 33 with the insertion seat 42. (When disengaged, a reverse operation is performed to disassemble the connecting section from the insertion seat.) The resilient plate 423 serves to resiliently abut against the connecting seat 33 so as to enhance the tight clamping effect between the connecting seat 33 and the insertion seat 42.

Figure 6:
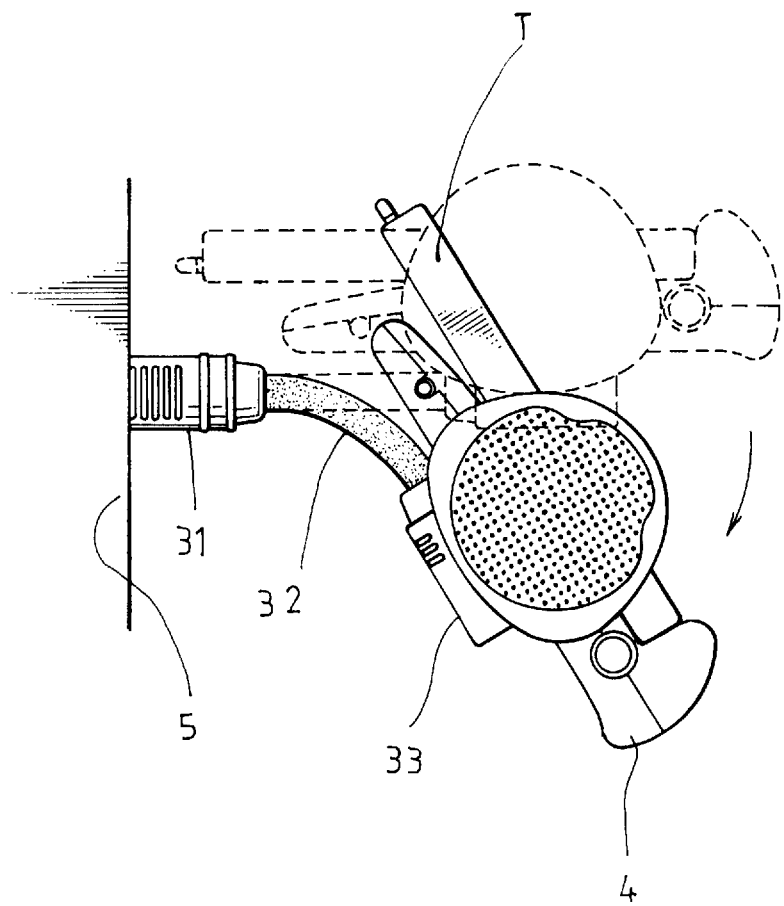
FIG. 6 shows the operation of the present invention in one state.
Figure 7:
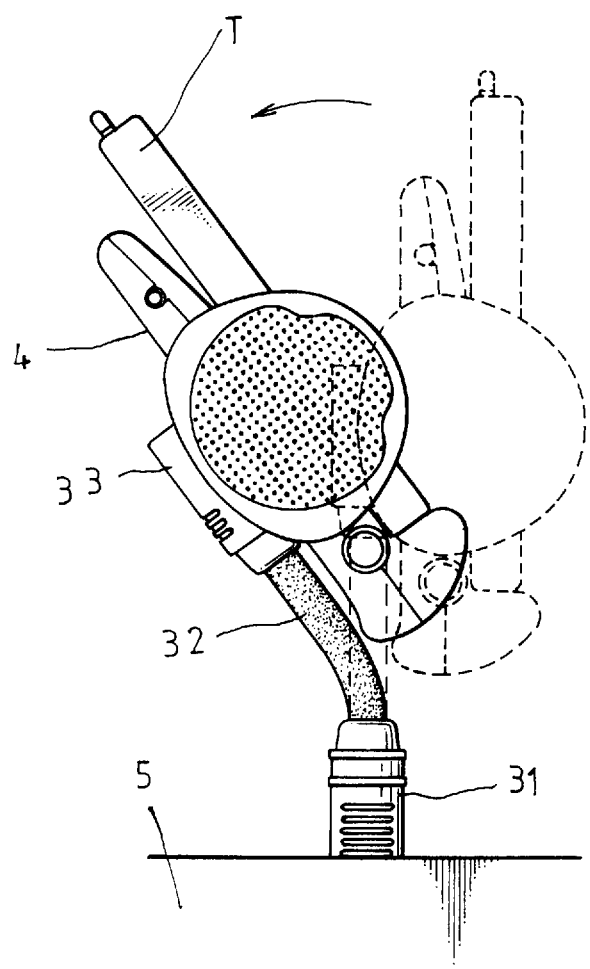
FIG. 7 shows the operation of the present invention in another state.

FIG. 6 shows that the present invention is inserted into a horizontal lighter socket. The middle section 32 of the supporting member 3 is freely flexible so that the mobile phone T can be adjustably placed at any position suitable for the user. With respect to an upright lighter socket as shown in FIG. 7, similarly, the middle section 32 of the supporting rod 3 can be freely bent to place the mobile phone T at an optimal position.

Figure 9:
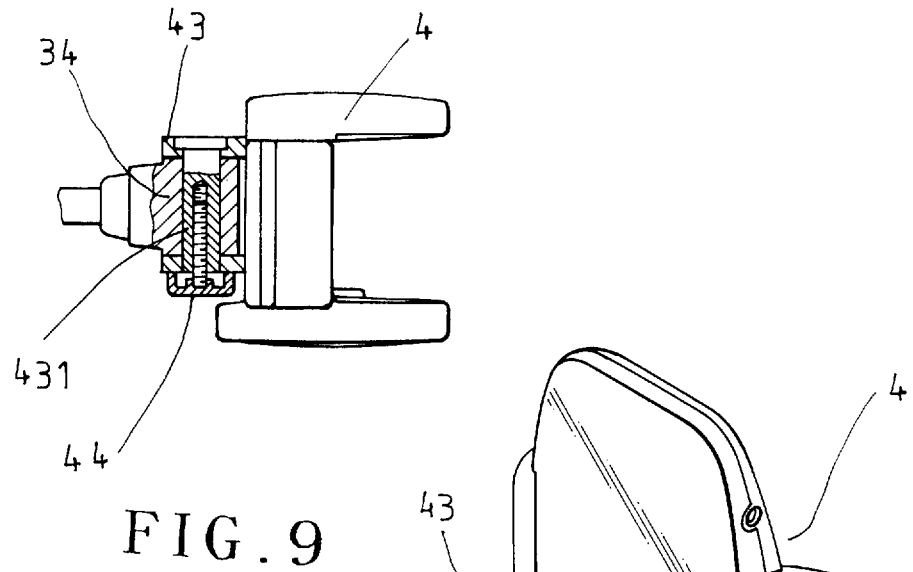
FIG. 9 is a partially sectional view of the second embodiment of the present invention.
Figure 8:
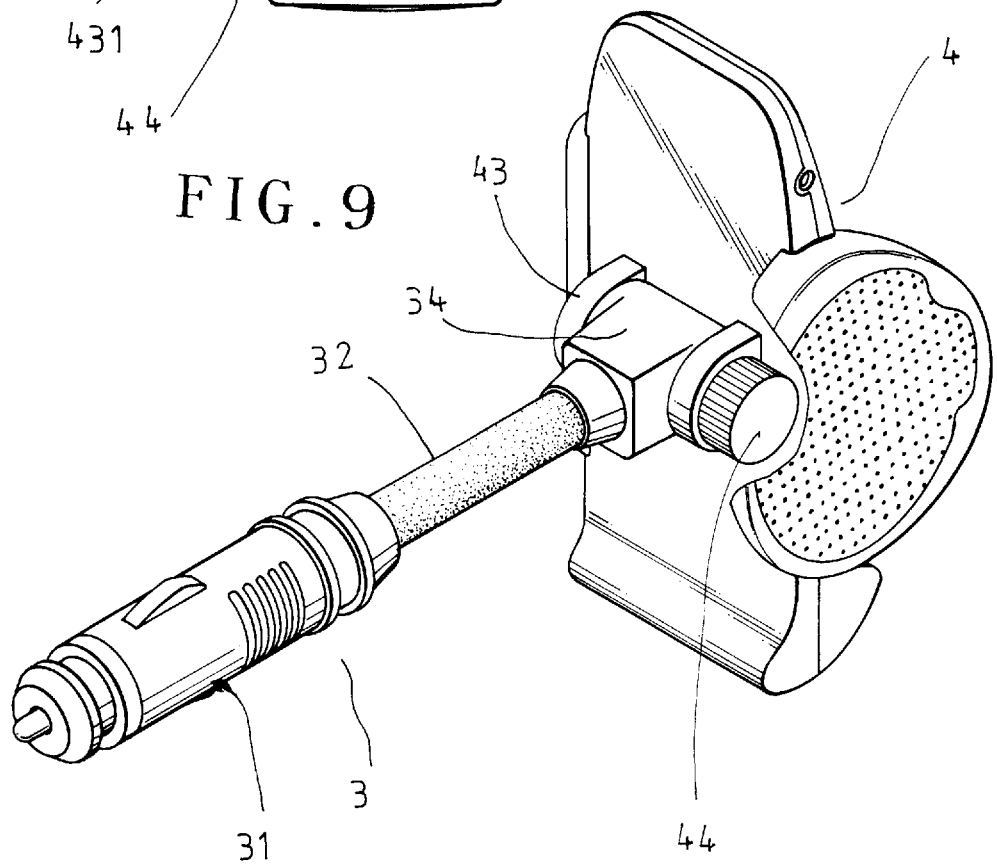
FIG. 8 is a perspective view of a second embodiment of the present invention.
Figure 10:
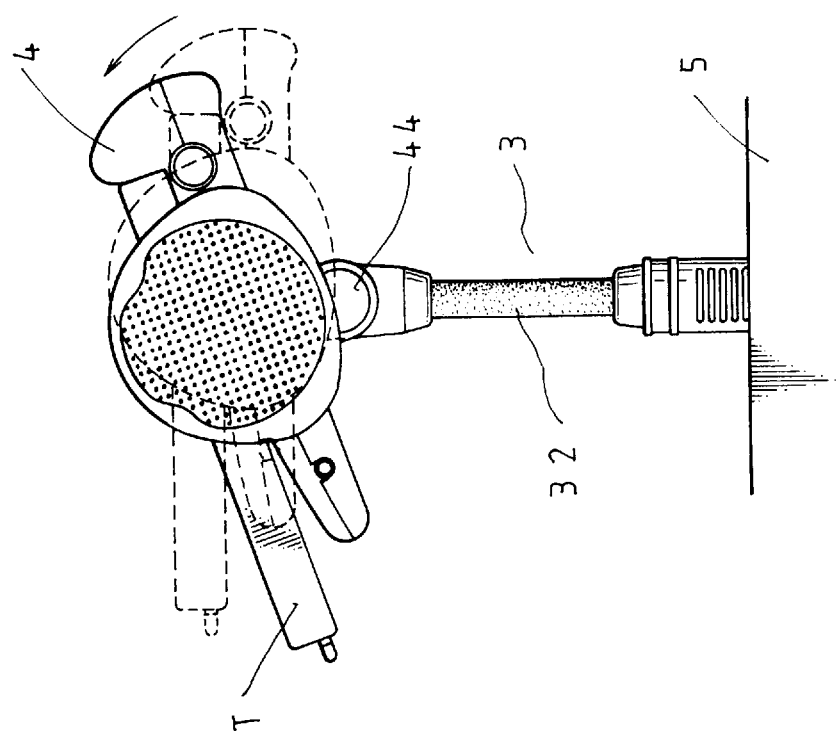
FIG. 10 shows the operation of the second embodiment of the present invention.

FIG. 8 shows another embodiment of the present invention, in which the back face of the fixing seat 4 is disposed with two supporting seats 43 and the free end of the supporting member 3 is disposed with a fixing block 34 fitted between the two supporting seats 43. A transverse sleeve 431 extends from the supporting seats 43 to pass through and locate the fixing block 34 and a cap nut 44 is used to tighten the sleeve 431, whereby the fixing seat 4 is engaged with the supporting member 3 as shown in FIG. 9. When it is desired to adjust the position of the mobile phone T, the cap nut 44 is first untightened and then the fixing seat 4 is adjusted to a suitable angle. Then the cap nut 44 is again tightened to accomplish the adjustment as shown in FIG. 10. Certainly, the middle section 32 of the supporting member 3 can be cooperatively adjusted in angle and position so as to meet the requirements of different users.

Figure 11:
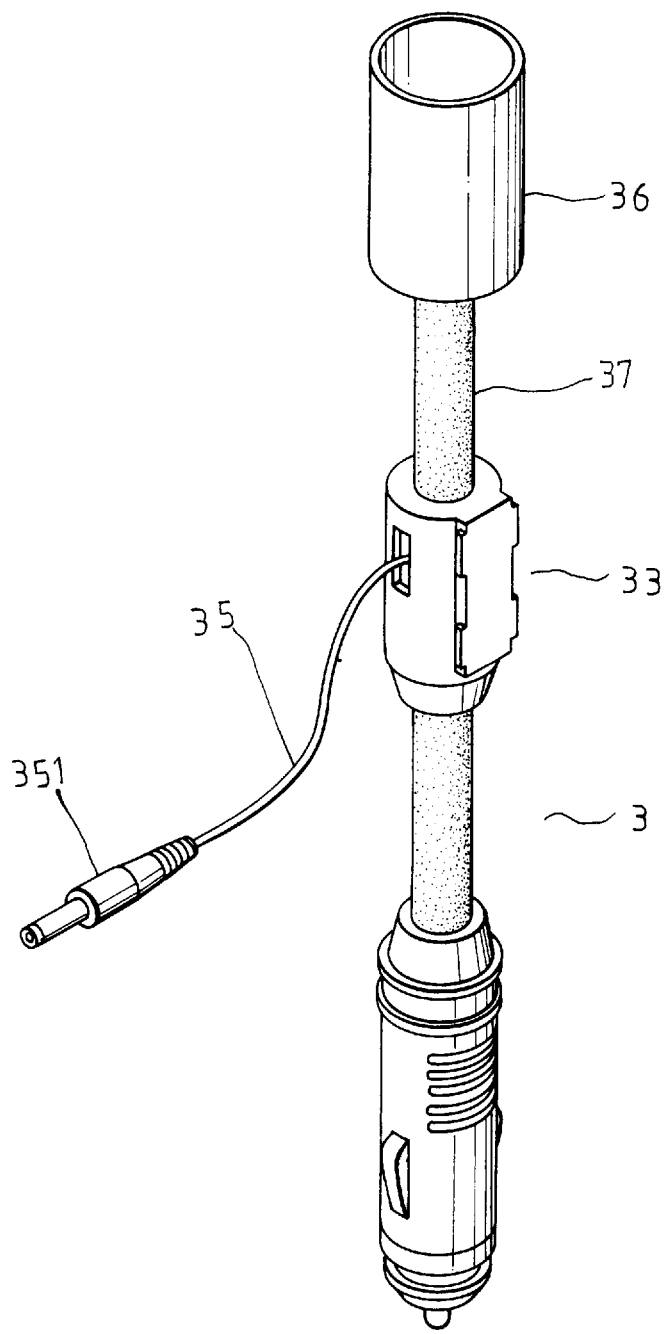
FIG. 11 is a perspective view of a third embodiment of the present invention.
Figure 12:
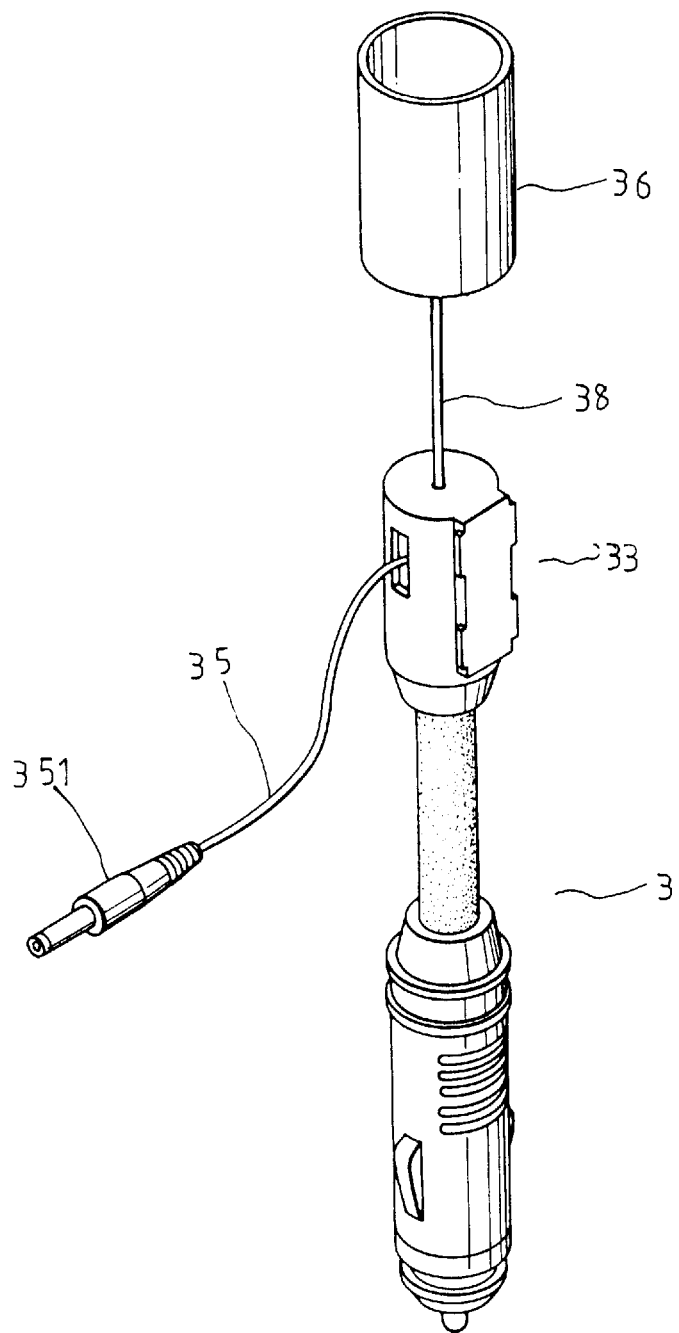
FIG. 12 is a perspective view of another aspect of the third embodiment of the present invention.

FIG. 11 shows still another embodiment of the present invention, in which a wire 35 extends from one side of the connecting section 33 of the supporting member 3. A plug 351 is connected with the free end of the wire 35 for inserting into the socket 411 of the fixing seat 4. The top end of the connecting section 33 is disposed with an elongated extension 37 or a wire 38 as shown in FIG. 12. A power socket 36 is connected with the free end of the extension 37 or the wire 38 for connecting with other electrical appliances to supply power therefor.

Figure 13:
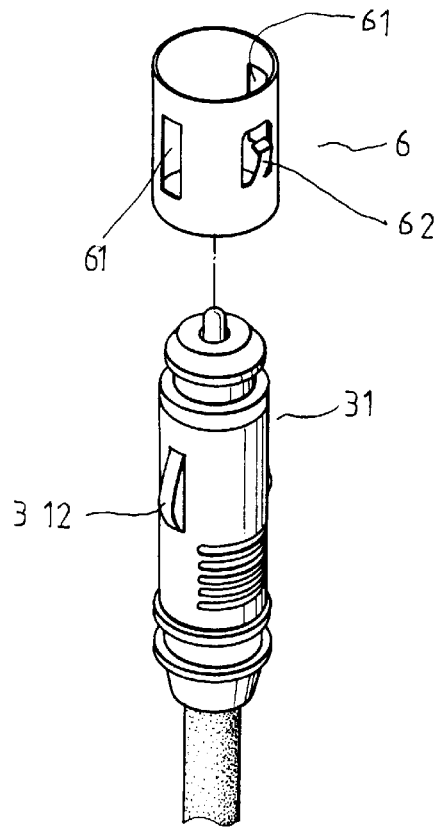
FIG. 13 is a partially perspective exploded view of a fourth embodiment of the present invention.
Figure 14:
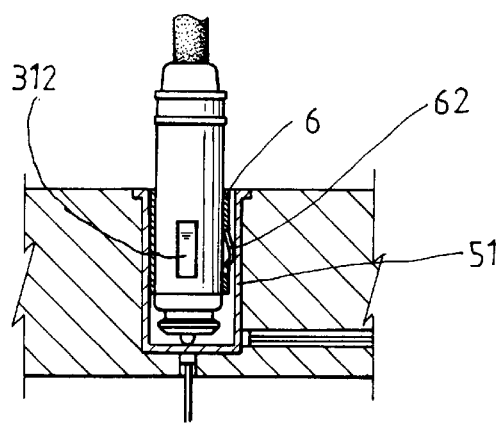
FIG. 14 is a partially sectional view of the fourth embodiment of the present invention.

FIG. 13 shows still another embodiment of the present invention, in which a hoop body 6 is fitted around the lighter plug 31 of the supporting member 3. The lateral side of the hoop body 6 is formed with at least one slot 61, whereby the lighter plug 31 can be fitted in the hoop body 6 with the resilient contact 312 protruding out of the slot 61 to abut against the wall of the lighter socket 51. The hoop body 6 also has a resilient plate 62, whereby by means of the hoop body 6, the lighter plug 31 can be inserted into a lighter socket with larger diameter without loosening as shown in FIG. 14.

Figure 15:
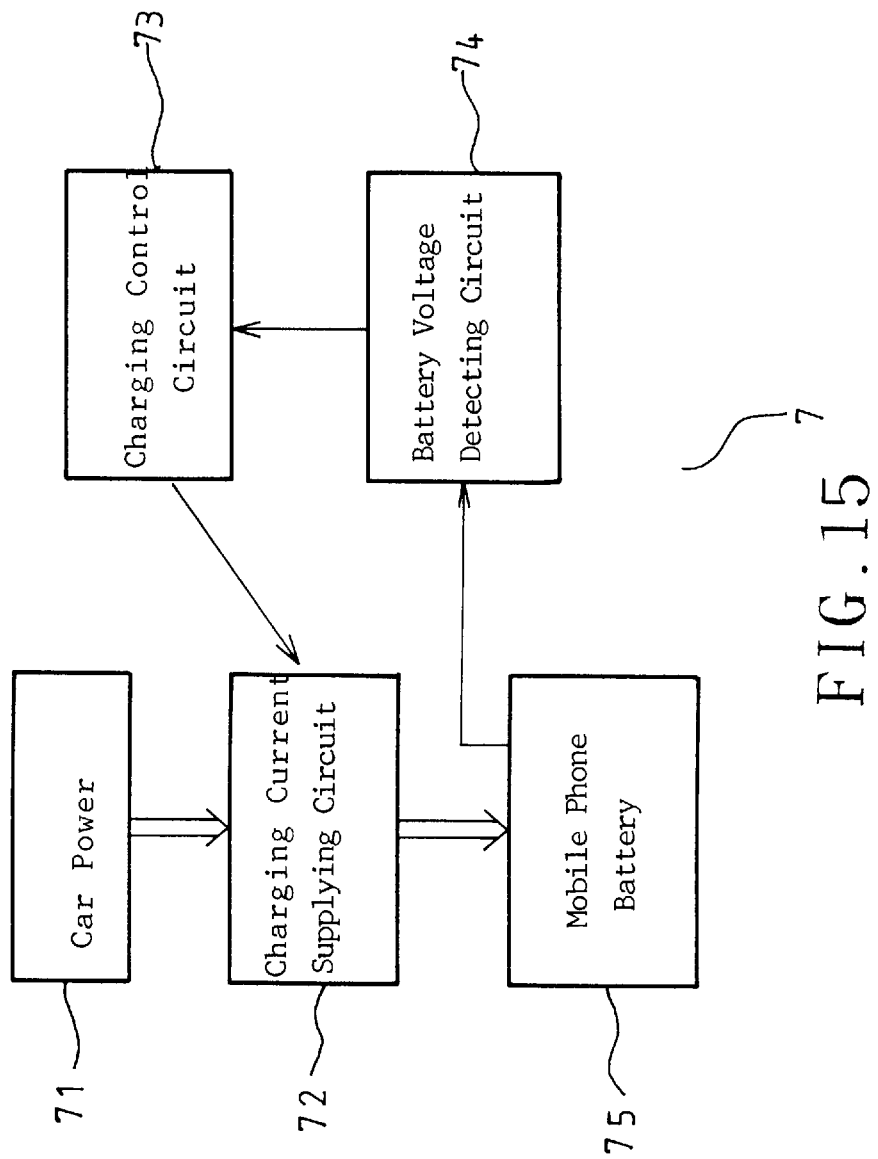
FIG. 15 is a block diagram showing that a battery charging device is received in the fixing seat.

Moreover, the receptacle of the fixing seat 4 can receive additional peripheral equipments such as the electrical appliance with charging, recording and holdfree functions. Although such peripheral equipment is not included in the scope of the present invention, the fixing seat 4 is still proved to be able to receive multiple peripheral equipments by the examples as follows:

Referring to FIG. 15, a charging device 7 for the mobile phone battery can be received in the fixing seat. The charging device through a charging current supplying circuit 72 conducts car power 71 from the lighter socket to the mobile phone battery 75. A battery voltage detecting in circuit 74 is used to detect the voltage value of the battery and the charging control circuit 73 controls whether the charging procedure should be continuously performed according to the detected voltage value.

Figure 16:
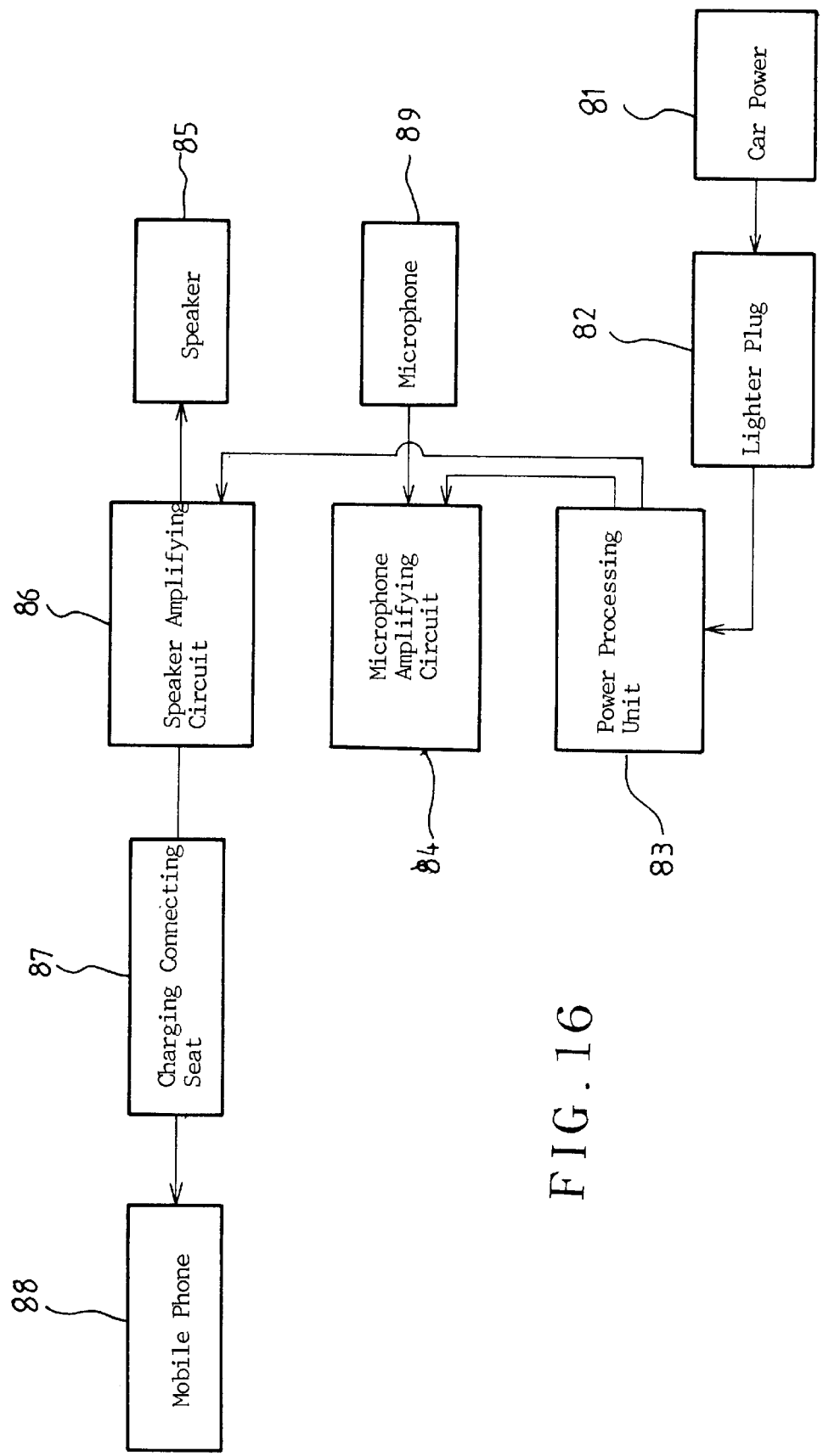
FIG. 16 is a block diagram showing that a mobile phone holdfree device is received in the fixing seat.

Referring to FIG. 16, the fixing seat can also receive a mobile phone holdfree device 8. The power processing unit 83 supplies car power 81 from the lighter socket 82 to the microphone amplifying circuit 84 for powering on the microphone 89, to the speaker amplifying circuit 86 for powering on the speaker 85 and to the charging connecting seat 87 and mobile phone 88.

The above embodiments are only some examples of the present invention and the scope of the present invention should not be limited to the examples. Any modification or variation derived from the examples should fall within the scope of the present invention.

What is claimed is:

1. An in-car used mobile phone fixing seat assembly to which other electrical appliances are addible, said fixing seat assembly comprising an electrically conductive flexible supporting member and a mobile phone fixing seat, wherein:

one end of the supporting member is connected to a cigarette lighter plug for inserting into a lighter socket of a car, wherein positive and negative contacts of said cigarette lighter plug electrically contact with positive and negative contacts of said lighter socket, the other end of the supporting member having a connecting section for engaging with the fixing seat, wherein a wire connected with a plug extends from one side of said connecting section for inserting into a socket of said fixing seat for electrically transmitting power supplied by said cigarette lighter plug; and the fixing seat has a receptacle for receiving a mobile phone and peripheral electrical equipments.

2. A fixing seat assembly as claimed in claim 1, wherein a middle section of the supporting member is made of freely flexible cable.

3. A fixing seat assembly as claimed in claim 1, wherein a hoop body is fitted around the lighter plug of the supporting member, the hoop body being formed with at least one slot, whereby the lighter plug can be fitted into the hoop body with the resilient contact protruding out of the slot to abut against the wall of the lighter socket so that the lighter plug can be snugly inserted into a lighter socket with larger diameter.

4. A fixing seat assembly as claimed in claim 1, wherein a top end of the connecting section of the supporting member is having an elongated extension or a wire and a power socket is connected to the extension or the wire for connecting to other electrical appliances and supplying power therefor.

5. A fixing seat assembly as claimed in claim 1, wherein an additional power output socket is disposed on a lower side or a lateral side of the fixing seat for connecting to other electrical appliances.

6. A fixing seat assembly as claimed in claim 1, wherein an engaging face is disposed on the connecting section, several wedge plates and wedge slots being disposed respectively on two lateral edges of the engaging face, a back face of the fixing seat having an insertion seat, several wedge plates and wedge slots being disposed on two lateral edges of the insertion seat corresponding to the wedge plates and wedge slots of the engaging face, the insertion seat further having a resilient plate and an insertion cavity, whereby the wedge plates of the connecting section of the supporting rod are fitted into the wedge slots of the insertion seat of the fixing seat and the resilient plate is biased and then the wedge plates of the connecting section are upwardly pushed into the insertion cavity to engage the connecting section with the insertion seat, the resilient plate serving to resiliently abut against the engaging face so as to enhance a tight clamping effect between the connecting section and the insertion seat.

7. A fixing seat assembly as claimed in claim 1, wherein the back face of the fixing seat having two supporting seats and the free end of the supporting rod having a fixing block fitted between the two supporting seats, a transverse sleeve extending from the supporting seats to pass through and locate the fixing block and a cap nut being used to tighten the sleeve, whereby the fixing seat is freely adjustably engaged with the supporting member.

* * * * *